United States Patent
Rhyu et al.

(10) Patent No.: US 9,454,995 B2
(45) Date of Patent: Sep. 27, 2016

(54) INFORMATION STORAGE MEDIUM STORING CONTENT, CONTENT PROVIDING METHOD, CONTENT REPRODUCING METHOD AND APPARATUS THEREFOR

(71) Applicant: Samsung Electronics Co., Ltd., Suwon-si, Gyeonggi-do (KR)

(72) Inventors: Sung-ryeul Rhyu, Yongin-si (KR); Bong-gil Bak, Suwon-si (KR); Jong-ho Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 482 days.

(21) Appl. No.: 14/093,228

(22) Filed: Nov. 29, 2013

(65) Prior Publication Data
US 2014/0156663 A1  Jun. 5, 2014

(30) Foreign Application Priority Data

Nov. 30, 2012 (KR) .................. 10-2012-0138407
Nov. 27, 2013 (KR) .................. 10-2013-0144995

(51) Int. Cl.
*G06F 17/30* (2006.01)
*G11B 27/32* (2006.01)
*G11B 27/031* (2006.01)

(52) U.S. Cl.
CPC .......... *G11B 27/322* (2013.01); *G11B 27/031* (2013.01)

(58) Field of Classification Search
CPC .......... G06F 17/3007; G06F 17/0091; G06F 17/30115
See application file for complete search history.

(56) References Cited

U.S. PATENT DOCUMENTS

| 6,735,583 | B1 | 5/2004 | Bjarnestam et al. |
| 8,433,678 | B2 | 4/2013 | Doi |
| 8,626,870 | B2 * | 1/2014 | Xu .......................... H04L 67/06 709/217 |
| 9,042,449 | B2 * | 5/2015 | Joch ....................... H04N 19/40 375/240.12 |
| 9,236,091 | B2 | 1/2016 | Doehla et al. |
| 2005/0025460 | A1 | 2/2005 | Hyodo et al. |
| 2006/0259724 | A1 | 11/2006 | Saika |
| 2008/0250047 | A1 | 10/2008 | Hannuksela |
| 2010/0146018 | A1 | 6/2010 | Kim |
| 2010/0165503 | A1 | 7/2010 | Choi et al. |
| 2010/0189424 | A1 | 7/2010 | Doehla et al. |

FOREIGN PATENT DOCUMENTS

| JP | 2003-22621 A | 1/2003 |
| JP | 2004-282703 A | 10/2004 |
| JP | 2005-33630 A | 2/2005 |
| JP | 2008-153886 A | 7/2008 |
| JP | 2010-136191 A | 6/2010 |
| JP | 2010-532605 A | 10/2010 |
| KR | 10-2010-0078810 A | 7/2010 |

* cited by examiner

*Primary Examiner* — Cheryl Lewis
(74) *Attorney, Agent, or Firm* — Jefferson IP Law, LLP

(57) ABSTRACT

An information storage medium is disclosed. The information storage medium includes one container file, wherein the container file includes a data box including in which a plurality of component files forming content are arranged; and a meta box including information on locations in the content and in the data box with respect to the plurality of component files and characteristic information on of the plurality of component files, and the plurality of component files are arranged in the data box according to the characteristic information.

44 Claims, 10 Drawing Sheets

FIG. 7

```
aligned(8) class ItemCharacteristicsBox extends FullBox('icha', version, 0) {
        unsigned int(16) item_count;          ——710
        for(int i=0; i<item_count;i++) {
                unsigned int(16) item_ID;              ——711
                unsigned int(1) immediate_access_flag;  ——712
                unsigned int(1) multiple_access_flag;   ——713
                unsigned int(1) disposable_access_flag; ——714
                unsigned int(1) preloading_access_flag; ——715
                unsigned int(4) reserved1;
                unsigned int(16) entry_count;          ——750
                for(int j=0;j<entry_count;j++) {       ——757
                        unsigned int(16) extent_index;    ——751
                        unsigned int(1) dependency_flag;  ——752
                        unsigned int(1) necessity_flag;   ——753
                        unsigned int(1) redundant_flag;   ——754
                        unsigned int(5) reserved2;
                        unsigned int(8) dependency_counter;  ——756
                }
        }
}
```

FIG. 8

```
aligned(8) class ItemCharacteristicsBox extends FullBox('ich2', version, 0) {
        unsigned int(16) item_count;  —— 810
        for(int i=0; i<item_count;i++) {
                unsigned int(16) item_ID;  —— 811
                unsigned int(16) entry_count;  —— 850
                for(int j=0; j<entry_count;j++) {
                        unsigned int(16) extent_index;  —— 851
                        unsigned int(1) immediate_access_flag;  —— 852
                        unsigned int(1) multiple_access_flag;  —— 853
                        unsigned int(1) disposable_access_flag;  —— 854
                        unsigned int(1) preloading_access_flag;  —— 856
                        unsigned int(8) dependency_flag;  —— 857
                        unsigned int(1) necessity_flag;  —— 858
                        unsigned int(1) redundant_flag;  —— 859
                        unsigned int(1) reserved1;
                        unsigned int(8) dependency_counter;  —— 860
                }
        }
}
```

```
aligned(8) class MetadataBackupOffsetBox extends FullBox('mebo', version, 0) {
    unsigned int(8) number_of_metadata_backup;    ——1510
    for(int i=0; i<number_of_metadata_backup;i++) {
        unsigned int(32) offset;    ——1520
    }
}
```

INFORMATION STORAGE MEDIUM STORING CONTENT, CONTENT PROVIDING METHOD, CONTENT REPRODUCING METHOD AND APPARATUS THEREFOR

RELATED APPLICATIONS

This application claims the benefit of Korean Patent Application No. 10-2012-0138407, filed on Nov. 30, 2013, and Korean Patent Application No. 10-2013-0144995, filed on Nov. 27, 2013, in the Korean Intellectual Property Office, the disclosures of which are incorporated herein in their entirety by reference.

BACKGROUND

1. Field

One or more embodiments of the present invention relate to an information storage medium storing content, a content providing method, a content reproducing method, a content providing apparatus, and a content reproducing apparatus.

2. Description of the Related Art

Optical discs, such as Blue-ray discs, digital versatile discs (DVDs) and the like, have been used as information storage media for providing multimedia content. Content recorded on these optical discs includes a plurality of files and has a previously determined directory structure. When such multimedia content including a plurality of files and having a unique directory structure is copied or moves to a medium using a different type of file system, it is difficult to expect or guarantee keeping a corresponding function. That is, it is difficult to reproduce the multimedia content in a device using another file system.

SUMMARY

One or more embodiments of the present invention include an information storage medium for storing efficiently reconfigured content of content component files delivered from another information storage medium recording content thereon, a method of providing reconfigured content, a method of reproducing reconfigured content, an apparatus for providing reconfigured content, an apparatus for reproducing reconfigured content, and a non-transitory computer-readable storage medium having stored therein program instructions, which when executed by a computer, perform the method of providing or reproducing reconfigured content.

One or more embodiments of the present invention are to effectively provide and reproduce content component files delivered from an information storage medium of which a loading speed is slow among information storage media. The information storage medium of which a loading speed is slow may include not only a physical medium, such as an optical disc, but also a case where a downloading speed is relatively slower than a local storage device, such as a case of downloading content component files from a server over the Internet.

One or more embodiments of the present invention are to effectively provide and reproduce content component files delivered from a medium when it is hard to access a portion of the medium due to an external cause. The medium hard to access due to an external cause indicates a medium such that a reader cannot read desired information from the entire or a portion of the medium due to various causes, such as contamination, scratch, physical shock, destruction, and the like.

Additional aspects will be set forth in part in the description which follows and, in part, will be apparent from the description, or may be learned by practice of the presented embodiments.

According to one or more embodiments of the present invention, an information storage medium includes: one container file, wherein the container file includes: a data box in which a plurality of component files forming content are arranged; and a meta box including information on locations in the content and in the data box with respect to the plurality of component files and characteristic information on the plurality of component files, and the plurality of component files are arranged in the data box according to the characteristic information.

Component files having same or similar characteristics may be recorded on sequential locations in the data box according to the characteristic information.

The characteristic information may include information indicating an access pattern to the plurality of component files when reproducing the plurality of component files.

The access pattern may indicate at least one selected from the group consisting of a random access, a multiple-access, a disposable access, and a preload.

The characteristic information may further include information indicating characteristics of a plurality of extents forming each of the plurality of component files.

The information indicating the characteristics of the plurality of extents may indicate a correlation between the plurality of extents.

The information indicating the characteristic of an extent may indicate at least one selected from the group consisting of whether the extent is referred to when another extent is reproduced, whether the extent is requisite to reproduce another extent, and whether at least a portion of the extent is replaceable by another extent.

The container file may further include a copy of the meta box.

The container file may have a file name indicating the characteristic information.

The file name of the container file may indicate a characteristic of a component file recorded on at least one of a plurality of sections forming the data box.

According to one or more embodiments of the present invention, a content providing method includes: acquiring a plurality of component files forming content; acquiring characteristic information of the plurality of component files; generating a data box in which the plurality of component files are arranged according to the characteristic information; generating a meta box including information on locations in the content and in the data box with respect to the plurality of component files and the characteristic information; and generating one container file including the data box and the meta box.

The generating of the data box may include arranging component files having same or similar characteristics on sequential locations in the data box according to the characteristic information.

The content providing method may further include recording a copy of the meta box in the container file.

The generating of the container file may include assigning a file name indicating the characteristic information to the container file.

According to one or more embodiments of the present invention, a content reproducing method includes: reading information included in a meta box from one container file recorded on an information storage medium, the container file including a data box in which a plurality of component files forming content are arranged according to characteristic information of the plurality of component files and the meta box including information on locations in the content and in the data box with respect to the plurality of component files and the characteristic information of the plurality of component files; reading data recorded in the data box by referring to the information included in the meta box; and reproducing the content by using the information included in the meta box and the data read from the data box.

The reading of the data may include reading data corresponding to a component file having characteristic information indicating a random access or a multiple-access from the information storage medium and loading the read data on another information storage medium of which a loading speed is faster than the information storage medium.

The reading of the data may include preloading a certain portion of data corresponding to a component file having characteristic information indicating a preload.

The reproducing of the content may include mapping a path of each component file in the content to an address of each component file in the data box by referring to the information included in the meta box.

The reproducing of the content may include reproducing a plurality of extents by referring to a correlation characteristic between the plurality of extents.

The content reproducing method may further include retrying to read a corresponding extent or receiving the corresponding extent from an external device if the corresponding extent to referred to or requisite for reproduction of another extent cannot be read from the information storage medium.

The content reproducing method may further include reproducing a corresponding extent section by referring to another extent if an extent replaceable by another extent cannot be read from the information storage medium.

According to one or more embodiments of the present invention, a content providing apparatus includes: an input unit for acquiring a plurality of component files forming content and characteristic information of the plurality of component files; a control unit for generating a data box in which the plurality of component files are arranged according to the characteristic information, a meta box including information on locations in the content and in the data box with respect to the plurality of component files and the characteristic information, and one container file including the data box and the meta box; and a storage unit for storing the generated container file.

According to one or more embodiments of the present invention, a content reproducing apparatus includes: a read unit for reading information included in a meta box from one container file recorded on an information storage medium, the container file including a data box in which a plurality of component files forming content are arranged according to characteristic information of the plurality of component files and the meta box including information on locations in the content and in the data box with respect to the plurality of component files and the characteristic information of the plurality of component files; a reproduction unit for reproducing the content; and a control unit for controlling the read unit to read data recorded in the data box by referring to the information included in the meta box and controlling the reproduction unit to reproduce the content by using the information included in the meta box and the data read from the data box.

BRIEF DESCRIPTION OF THE DRAWINGS

These and/or other aspects will become apparent and more readily appreciated from the following description of the embodiments, taken in conjunction with the accompanying drawings in which:

FIG. 7 illustrates characteristic information according to an embodiment of the present invention;

FIG. 8 illustrates characteristic information according to another embodiment of the present invention;

DETAILED DESCRIPTION

Figure 1:
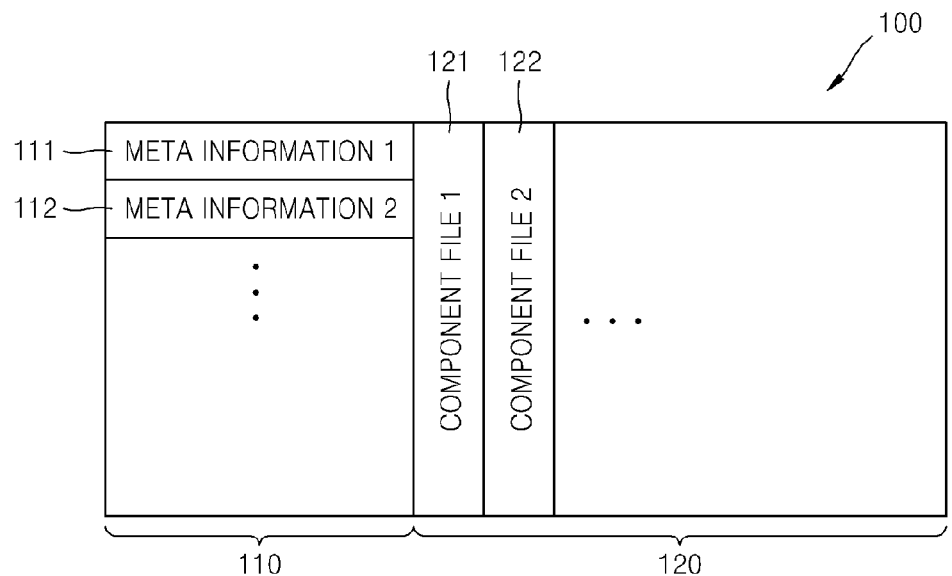
FIG. 1 illustrates a configuration of a container file according to an embodiment of the present invention.

The terms used in the specification will be schematically described, and then, the present invention will be described in detail.

Although general terms as currently widely used as possible are selected as the terms used in the present invention while taking functions in the present invention into account, they may vary according to an intention of those of ordinary skill in the art, judicial precedents, or the appearance of new technology. In addition, in specific cases, terms intentionally selected by the applicant may be used, and in this case, the meaning of the terms will be disclosed in a corresponding description of the invention. Accordingly, the terms used in the present invention should be defined not by simple names of the terms but by the meaning of the terms and the contents over the present invention.

In the specification, when a certain part "includes" a certain component, this indicates that the part may further include another component instead of excluding another component unless there is different disclosure. In addition, the term, such as " . . . unit" or "module," disclosed in the specification indicates a unit for processing at least one function or operation, and this may be implemented by hardware, software, or a combination thereof.

Hereinafter, embodiments of the present invention will be described in detail with reference to the accompanying drawings so that those of ordinary skill in the art may easily realize the present invention. However, the present invention may be embodied in many different forms and should not be construed as being limited to the embodiments set forth herein. In the drawings, parts irrelevant to the description are omitted to clearly describe the present invention, and like reference numerals denote like elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a configuration of a container file according to an embodiment of the present invention.

Referring to FIG. 1, a plurality of component files 121 and 122 forming original content may be recorded in one file 100 and provided. In one or more embodiments of the present invention, the file 100 is referred to as a container file. The container file 100 may be divided into two parts, a data box 120 including the plurality of component files 121 and 122 forming the original content and a meta box 110 for recording therein meta information of the plurality of component files 121 and 122.

In the meta box 110, characteristic information of each of the plurality of component files 121 and 122 recorded in the data box 120 may be recorded as meta information 111 and 112. In addition, a characteristic common to the plurality of component files 121 and 122 may be recorded in the meta box 110. A content providing apparatus for reconfiguring the original content arranges the plurality of component files 121 and 122 of the original content in the data box 120 by using input characteristic information. A content reproducing apparatus may classify characteristics of the plurality of component files 121 and 122 by using the characteristic information recorded in the meta box 110 and may differently process reproduction and loading of the plurality of component files 121 and 122 according to the classified characteristics. For example, when the plurality of component files 121 and 122 are recorded in the data box 120, component files having same or similar characteristics are arranged on temporally or spatially sequential locations. Accordingly, even when the container file 100 is copied or moves to a different type of file system, temporal or spatial locations of the component files having same or similar characteristics are guaranteed to be sequential, thereby efficiently performing reproduction or loading of the component files having same or similar characteristics.

Figure 2:
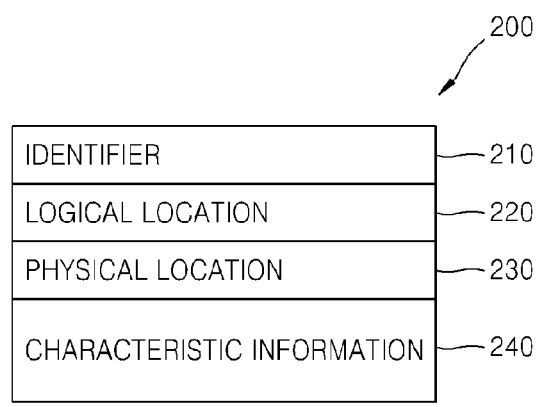
FIG. 2 illustrates a configuration of meta information according to an embodiment of the present invention.

FIG. 2 illustrates a configuration of meta information 200 according to an embodiment of the present invention.

Referring to FIGS. 1 and 2, the meta information 200 of a component file may include a logical location 220 of the component file in the original content and a physical location 230 of the component file in the data box 120 included in the container file 100. The logical location 220 in the original content is referred to as an address in which the component file has been located in the original content including the plurality of component files 121 and 122. For example, when a component file named 01000.clpi recorded in a directory named /root/BDMV/CLIPINF/ of a Blue-ray disc is arranged in the container file 100, the logical location 220 of 01000.clpi is /root/BDMV/CLIPINF/01000.clpi. The physical location 230 of 01000.clpi in the data box 120 may be represented by an offset value indicating a location on which the component file is recorded in the container file 100. For example, when /root/BDMV/CLIPINF/01000.clpi is recorded on a location apart by 0x0100 from a start location or reference location of the data box 120, the physical location 230 recorded in the meta information 200 is 0x0100. In addition, in the physical location 230, size information or an address range of the component file may be recorded. For example, the physical location 230 of the component file may be represented by 'e:\content_container.ndf, item_ID=1000, extent_entry#0=0x0100~0x1100', and it may be analyzed that a name of the container file 100 in which the component file is recorded is content_container.ndf, an item identifier is 1000, and extents forming an item are recorded in an address range of 0x0100 to 0x1100 in the data box 120.

The meta information 200 may include characteristic information 240 of the component file. The plurality of component files 121 and 122 forming the input content are arranged in the data box 120 according to the characteristic information 240 of each of the plurality of component files 121 and 122.

In addition, the meta information 200 may separately include the identifier 210 for identifying the component file. The meta information 200 among a plurality of pieces of meta information may be identified by the identifier 210. According to another embodiment of the present invention, the logical location 220 of the component file may be used as an identifier without separately using the identifier 210.

Figure 3:
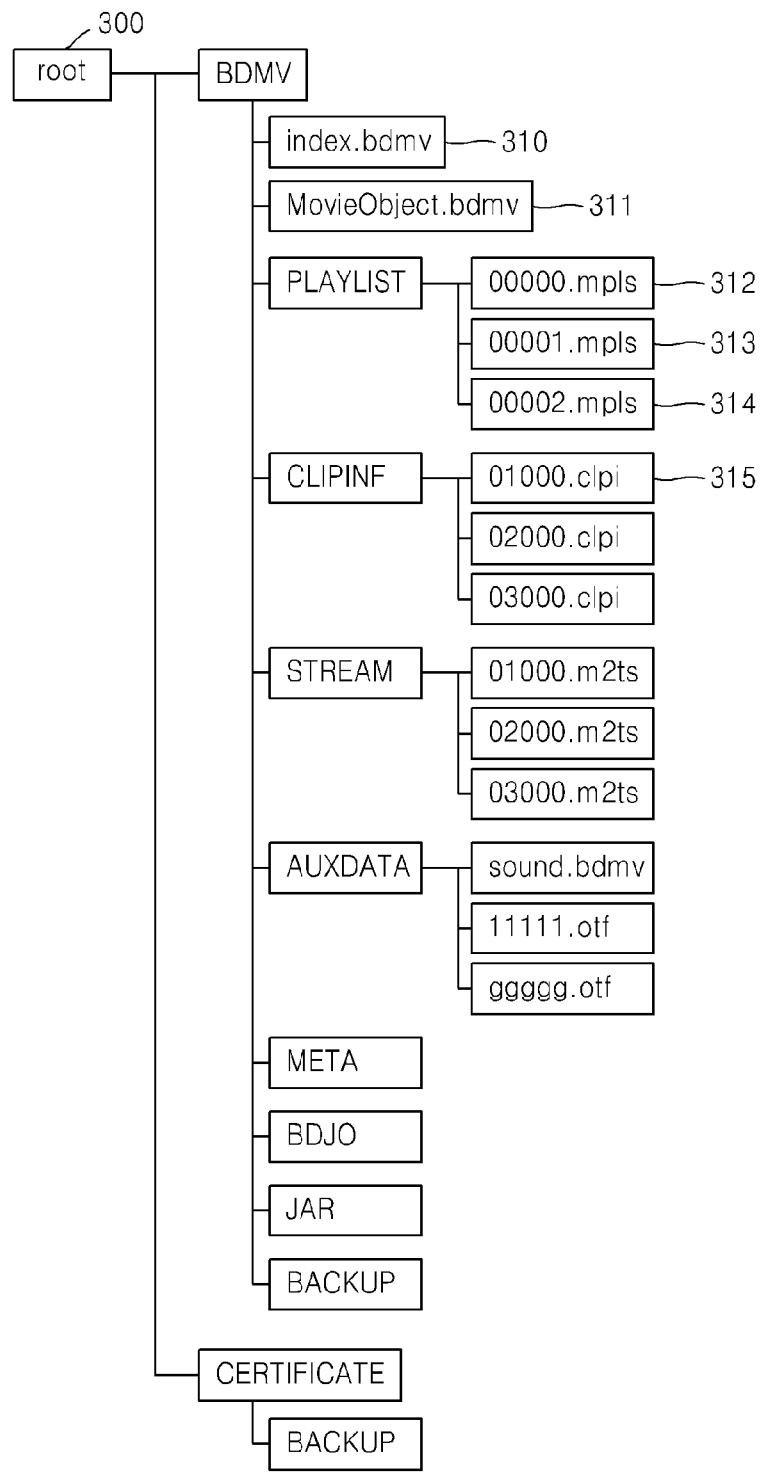
FIG. 3 illustrates a configuration of a file system on a Blue-ray disc according to an embodiment of the present invention.

FIG. 3 illustrates a configuration of a file system on a Blue-ray disc according to an embodiment of the present invention.

Referring to FIG. 3, original content in the Blue-ray disc is recorded with a plurality of directories and a plurality of component files in a root directory 300 and includes component files named index.bdmv 310, MovieObject.bdmv 311, 00000.mpls 312, 00001.mpls 313, 00002.mpls 314, 01000.clpi 315, and the like. A content providing apparatus according to an embodiment of the present invention generates and provides one container file by reconfiguring the original content. The component files included in the original content are recorded in a data box of the container file, and a location on which each of the component files is arranged may be determined according to input characteristic information.

Figures 4, 5:
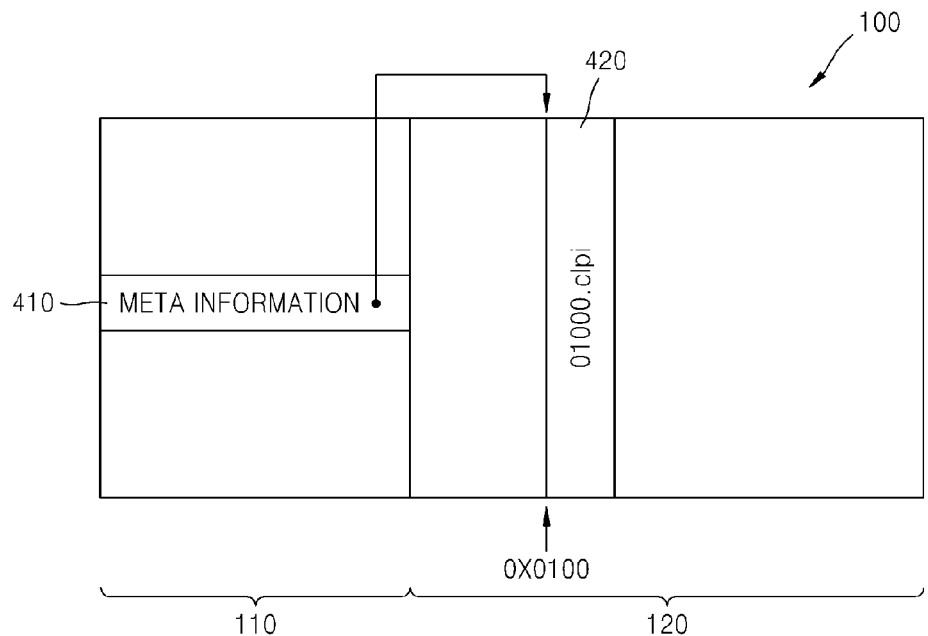
FIG. 4 illustrates a relationship between meta information and a component file according to an embodiment of the present invention.
FIG. 5 illustrates a configuration of meta information according to another embodiment of the present invention.

FIG. 4 illustrates a relationship between meta information 410 and a component file named 01000.clpi 420 according to an embodiment of the present invention.

Referring to FIG. 4, a physical location of the component file named 01000.clpi 420 is determined as 0x0100, the component file named 01000.clpi 420 is recorded in 0x0100, and the meta information 410 corresponding to the component file named 01000.clpi 420 includes information indicating the physical location of 0x0100. In this manner, all the component files illustrated in FIG. 3 are recorded in the data box 120, and meta information of the recorded component files is generated and recorded in the meta box 110.

FIG. 5 illustrates a configuration of meta information according to another embodiment of the present invention.

Referring to FIGS. 4 and 5, the meta information 410 corresponding to the component file named 01000.clpi 420 may include an identifier named item_ID 510, path information named /root/BDMV/CLIPINF/01000.clpi 520 corresponding to a location in the original content, offset information of 0x0100 indicating a location in the data box 120, and characteristic information 540 indicating that the component file has a multiple-access characteristic.

According to an embodiment of the present invention, to effectively provide content on a medium of which a loading speed is slow, suitable characteristic values are assigned to component files forming the content according to characteristics of the component files, and a content reproducing apparatus reads the component files from a container file according to the characteristic values. The component files may be physically inserted into the container file as described in the above embodiments, but the component files may be logically inserted without being actually inserted into the container file. That is, it may be implemented that each meta information indicates a corresponding component file in an external container file. A component file may be divided into at least one extent and managed, and in this case, characteristic information corresponding to the entire or a portion of the at least one extent in the component file may be separately provided. A content reproducing apparatus may read characteristic information corresponding to each extent and perform a read, loading, or reproduction operation suitable for the read characteristic information.

Characteristic information of component files may include at least one selected from the group consisting of "a random access characteristic" indicating the occurrence of an access to a component file at a time point that cannot be predicted by a content reproducing apparatus, i.e., a random time point, by a selection of a user on a menu, a background picture, a bitmap font, a font, or the like according to a type and/or an access pattern of the component file, "a multiple-access characteristic" indicating a component file, such as a menu, a background picture, a bitmap font, a font, or the like, which a content reproducing apparatus obviously access more than once, "a disposable consumption characteristic" indicating that the possibility of a re-access after one access is low when a component file, such as an original video or a trailer video, is consumed or indicating that a size of the component file is remarkably greater than that of a component file having the multiple-access characteristic, and "a preloading characteristic" indicating a component file that needs to be previously read for the purpose of user experience improvement or the like to immediately respond to a user request.

However, the characteristic information of component files is not limited thereto, and only if a characteristic requires a certain processing method for efficient reproduction, the characteristic may be included in characteristic information according to one or more embodiments of the present invention. For example, when a component file delivered from a medium, a portion of which being hard to access due to an external cause, cannot be read, if characteristic information "possibly skip" is assigned to the component file, a next component file may be controlled to be reproduced without stopping the reproduction.

Characteristic information of extents forming a component file may indicate correlations between the extents. For example, according to mutual importance of the extents, the characteristic information of extents may include at least one selected from the group consisting of "a dependency characteristic" indicating that a portion or the entire of a corresponding extent is referred to by another extent, "a necessity characteristic" indicating that a portion or the entire of a corresponding extent is requisite to reproduce or execute another extent, and "a redundancy characteristic" indicating that a portion or the entire of a corresponding extent is replaceable by another extent.

Figure 6:
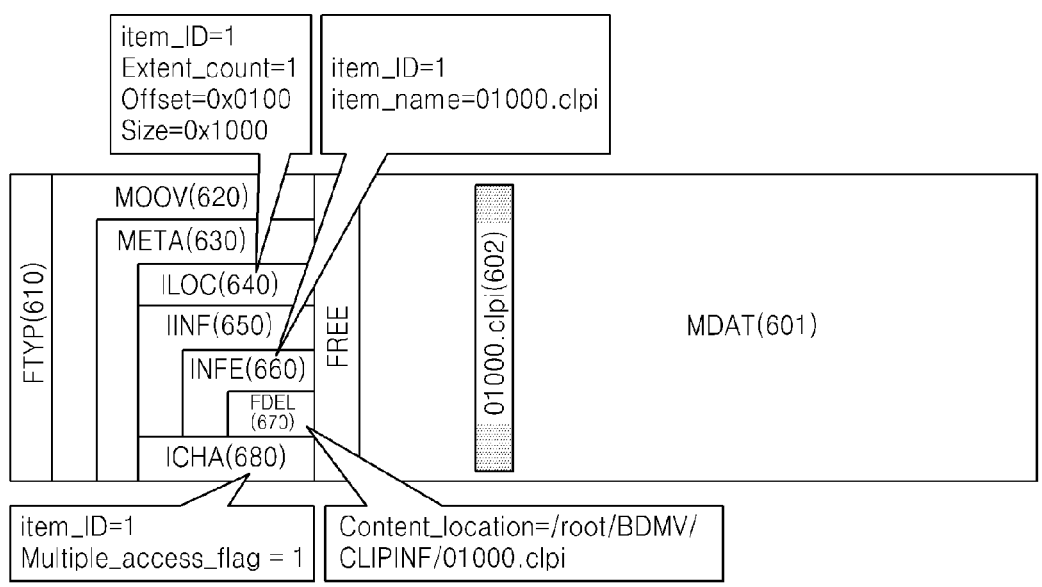
FIG. 6 illustrates a configuration of a container file according to another embodiment of the present invention.

FIG. 6 illustrates a configuration of a container file according to another embodiment of the present invention. Although a method of implementing the container file and characteristic information by extending an ISO/IEC 14496-12 ISO base media file format (ISOFF) is described in the present embodiment, a method of implementing the container file and the characteristic information, according to one or more embodiments of the present invention, is not limited thereto, and it would be obvious to those of ordinary skill in the art that the container file and the characteristic information are implemented using another format or another language.

An FTYP box 610 is to designate a file type, and a brand name indicating that a corresponding file is a container file according to one or more embodiments of the present invention may be recorded in the FTYP box 610. When the brand name in the FTYP box 610 has a pre-defined value, it may be recognized that a container file according to one or more embodiments of the present invention is stored. That is, when the FTYP box 610 has a certain value, a content reproducing apparatus according to an embodiment of the present invention may reproduce the corresponding container file.

A META box 630 in a MOOV box 620 of the ISOFF may include an ILOC box 640, an IINF box 650, an INFE box 660, an FDEL box 670, and an ICHA box 680.

The ILOC box 640 is used to represent identification information (item_ID) of component files physically or logically inserted into a container file, a location (Offset) indicating where a bit-string fragment of the component files exists in the container file, and a size (Size) of the bit-string fragment. One component file may be stored in the container file as one sequential-bit string or a plurality of sequential-bit strings divided by a certain criterion. The ILOC box 640 provides information on a unit referred to as "item" which may be mapped to one component file or a plurality of component files, and the item includes one extent or a plurality of extents, wherein an extent is a sequential-bit string. The ILOC box 640 may describe a location and a size of each extent in the container file. The ILOC box 640 may further include the number of extents (Extent_count) included in the item. In the container file according to the embodiment of FIG. 6, the item in the ILOC box 640 is mapped to one component file, and a location stored in the container file with respect to a sequential-bit string corresponding to the entire or a portion of the component file and a size of each sequential-bit string are represented using an extent.

The IINF box 650 is used to include a name (item_name) of a component file mapped to a corresponding item and to include the FDEL box 670. The FDEL box 670 is used to include path information in original content, which is a logical address (content_location) of a component file.

The ICHA box 680 is used to describe characteristic information of each item in the ILOC box 640 describing locations and sizes of extents of a component file and characteristic information of extents included in each item.

An MDAT box 601 is a data box and a space in which a component file 602 is recorded.

FIG. 7 illustrates characteristic information according to an embodiment of the present invention, wherein the characteristic information is implemented for component files by using the ICHA box 680 of FIG. 6 in the ISOFF. Referring to FIGS. 6 and 7, the ICHA box 680 provides characteristic information of items described in the ILOC box 640 and characteristic information of the entire or a portion of extents in each item.

Item_count 710 indicates the number of items described in the ICHA box 680. Item_ID 711 indicates item_ID defined by the ILOC box 640.

Immediate_access_flag 712 relates to "the random access characteristic" of a component file corresponding to an item and indicates whether an access to the component file occurs at a time point which cannot be predicted by a content reproducing apparatus. A case where a value of immediate_access_flag 712 is 1 indicates that the random access characteristic exists, and a case where the value of immediate_access_flag 712 is 0 indicates that whether the random access characteristic exists is unknown.

Multiple_access_flag 713 relates to "the multiple-access characteristic" and indicates whether an access to a corresponding component file obviously occurs more than once. A case where a value of multiple_access_flag 713 is 1 indicates that the multiple-access characteristic exists, and a case where the value of multiple_access_flag 713 is 0 indicates that whether the multiple-access characteristic exists is unknown.

Disposable_access_flag 714 relates to "the disposable consumption characteristic" and indicates whether the possibility of a re-access after one access to a corresponding component file is low. A case where a value of disposable_access_flag 714 is 1 indicates that the disposable consumption characteristic exists, and a case where the value of disposable_access_flag 714 is 0 indicates that whether the disposable consumption characteristic exists is unknown.

Preloading_access_flag 715 relates to "the preloading characteristic" and indicates whether at least a portion of the contents of a corresponding component file needs to be previously loaded to a memory. A case where a value of preloading_access_flag 715 is 1 indicates that reproduction efficiency may be improved when a portion or the entire of the corresponding component file is previously read, and a case where the value of preloading_access_flag 715 is 0 indicates that whether the preloading characteristic exists is unknown. For content recorded on a Blue-ray disc, chapter jump may be an example of the preloading characteristic. When seeking from one chapter to a subsequent or previous chapter by a user request, this is accompanied by a physical motion of a read unit, and thus, a response latency may occur. If data corresponding to a length considering a time to be taken due to a motion of the read unit from a start location of each chapter marked with "the preloading characteristic" is read in advance before starting reproduction, a gain against a response latency according to a chapter jump request of a user may be generated.

Entry_count 757 indicates the number of extents described in the ICHA box 680. Extent_index 751 indicates an extent described in the ILOC box 640, i.e., extent index 751 may include information for identifying the extent. By using entry_count 757 and extent_index 751, it is possible that only characteristic information of partial extents is described instead of describing characteristic information of all extents corresponding to a certain item.

Dependency_flag 752 relates to "the dependency characteristic" and indicates whether a corresponding extent is referred to by another extent. A case where a value of dependency_flag 752 is 1 indicates that the corresponding extent has the dependency characteristic, and a case where the value of dependency_flag 752 is 0 indicates that whether the dependency characteristic exists is unknown. For example, a video component file may be set as an extent having "the dependency characteristic" because an extent corresponding to I-Frame, P-Frame, I-Slice, or P-Slice is referred to by another extent.

Necessity_flag 753 relates to "the necessity characteristic" and indicates whether at least a portion of the contents of a corresponding extent is requisite to reproduce or execute another extent. A case where a value of necessity_flag 753 is 1 indicates that the necessity characteristic exists, and a case where the value of necessity_flag 753 is 0 indicates that whether the necessity characteristic exists is unknown. For example, a video component file may be set as an extent having "the necessity characteristic" because an extent corresponding to group of picture (GOP) information or AU boundary information is requisite to reproduce or execute another extent.

Redundant_flag 754 relates to "the redundancy characteristic" and indicates whether at least a portion of the contents of a corresponding extent is replaceable by another extent. A case where a value of redundant_flag 754 is 1 indicates that the redundancy characteristic exists, and a case where the value of redundant_flag 754 is 0 indicates that whether the redundancy characteristic exists is unknown. For example, a video component file may be set as an extent having "the redundancy characteristic" because partial contents of an extent corresponding to B-Frame or B-Slice are replaceable by another extent.

Dependency counter 756 indicates the number of subsequent extents affected by whether a corresponding extent exists if the value of dependency_flag 752 or necessity_flag 753 is 1. If a value of dependency_counter 756 is 0, the number of affected subsequent extents is unknown.

FIG. 8 illustrates characteristic information according to another embodiment of the present invention, wherein the characteristic information is only for each of extents forming each component file.

Referring to FIGS. 6 and 8, Item_count 810 indicates the number of items described in the ICHA box 680. If component files one-to-one correspond to items, item_count 810 may be the same as the number of component files forming content. Item_ID 811 indicates item_ID defined by the ILOC box 640.

Entry_count 850 indicates the number of extents described in the ICHA box 680. Extent_index 851 indicates an index of a corresponding extent.

Immediate_access_flag 852 relates to "the random access characteristic" and indicates whether an access to a corresponding extent occurs at a time point which cannot be predicted by a content reproducing apparatus. A case where a value of immediate_access_flag 852 is 1 indicates that the random access characteristic exists, and a case where the value of immediate_access_flag 852 is 0 indicates that whether the random access characteristic exists is unknown.

Multiple_access_flag 853 relates to "the multiple-access characteristic" and indicates whether an access to a corresponding extent obviously occurs more than once. A case where a value of multiple_access_flag 853 is 1 indicates that the multiple-access characteristic exists, and a case where the value of multiple_access_flag 853 is 0 indicates that whether the multiple-access characteristic exists is unknown.

Disposable_access_flag 854 relates to "the disposable consumption characteristic" and indicates whether the possibility of a re-access after one access to a corresponding extent is low. A case where a value of disposable_access_flag 854 is 1 indicates that the disposable consumption characteristic exists, and a case where the value of disposable_access_flag 854 is 0 indicates that whether the disposable consumption characteristic exists is unknown.

Preloading_access_flag 855 relates to "the preloading characteristic" and indicates whether a corresponding extent needs to be previously read. A case where a value of preloading_access_flag 855 is 1 indicates that the preloading characteristic exists, and a case where the value of preloading_access_flag 855 is 0 indicates that whether the preloading characteristic exists is unknown.

Dependency_flag 857 relates to "the dependency characteristic" and indicates whether at least a portion of the contents of a corresponding extent is referred to by another extent. A case where a value of dependency_flag 857 is 1 indicates that the dependency characteristic exists, and a case where the value of dependency_flag 857 is 0 indicates that whether the dependency characteristic exists is unknown.

Necessity_flag 858 relates to "the necessity characteristic" and indicates whether at least a portion of the contents of a corresponding extent is requisitely to reproduce or execute another extent. A case where a value of necessity_flag 858 is 1 indicates that the necessity characteristic exists, and a case where the value of necessity_flag 858 is 0 indicates that whether the necessity characteristic exists is unknown.

Redundant_flag 859 relates to "the redundancy characteristic" and indicates whether at least a portion of the contents of a corresponding extent is replaceable by another extent. A case where a value of redundant_flag 859 is 1 indicates that the at least a portion of the contents of the corresponding extent is replaceable by another extent because the redundancy characteristic exists, and a case where the value of redundant_flag 859 is 0 indicates that whether the redundancy characteristic exists is unknown.

Dependency_counter 860 indicates the number of subsequent extents affected by whether a corresponding extent exists if the value of dependency_flag 857 or necessity_flag 858 is 1. If a value of dependency_counter 860 is 0, the number of affected subsequent extents is unknown.

According to another embodiment of the present invention, an item having item ID of a reserved value, e.g. 0, among items in the ILOC box 640 may be used to describe a characteristic of the entire container file or the entire MDAT box 601. In this case, a content reproducing apparatus may perceive a characteristic value of the entire container file or the entire MDAT box 601 by first reading characteristic information corresponding to the item of which item_ID is 0.

Figure 9:
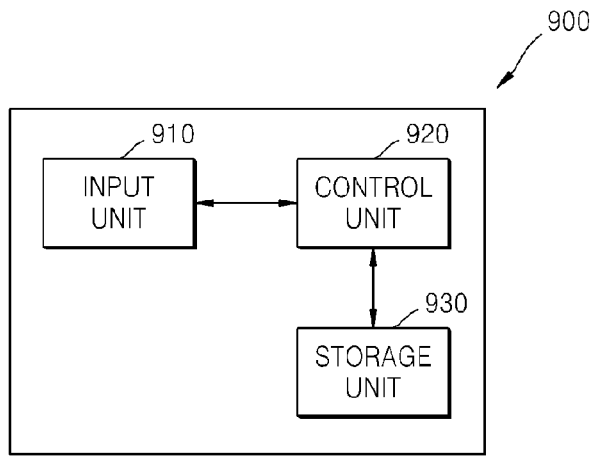
FIG. 9 is a block diagram of a content providing apparatus according to an embodiment of the present invention.

FIG. 9 is a block diagram of a content providing apparatus 900 according to an embodiment of the present invention.

The content providing apparatus 900 may be implemented by a computing apparatus including an input unit 910, a control unit 920, and a storage unit 930. The input unit 910 is to acquire content and characteristic information and may include at least one selected from the group consisting of a pickup device for reading data from a recording medium, such as an optical disc, a user interface for receiving characteristic information component files forming content from a user or a content producer, and a communication unit for receiving content or characteristic information from an external server. Input content may include a plurality of component files, and characteristic information may include characteristic information of each component file and/or characteristic information of each of extents forming each component file.

The control unit 920 may generate a data box in which the plurality of component files are arranged according to the characteristic information and a meta box including information on data recorded in the data box. The information included in the meta box may include information on a location in the content and a location in the data box with respect to the plurality of component files and the characteristic information. The control unit 920 generates on container file including the data box and the meta box and stores the container file in the storage unit 930.

The control unit 920 may arrange component files having same or similar characteristics on sequential locations in the data box according to the characteristic information when generating the data box. In this case, the characteristic information may include information indicating an access pattern in reproduction with respect to the plurality of component files. The access pattern may be information indicating at least one selected from the group consisting of a random access, a multiple-access, a disposable access, and a preload. The control unit 920 may arrange component files having a same characteristic on sequential locations in a bit string according to the characteristic information when generating the container file so that a read unit (a mechanical pickup, a header, and the like) of a content reproducing apparatus minimizes seeking on a physical address or a logical address and reads a corresponding section through sequential reading. For example, the control unit 920 records component files having the multiple-access characteristic on sequential locations in the data box. During reproduction, these component files are frequently used, and since the component files are recorded on the sequential locations, an access time is reduced, thereby allowing efficient reproduction.

The characteristic information may be defined for each of extents forming a component file, and characteristic information of the extents may be information indicating a correlation characteristic between the extents. For example, information indicating a characteristic of an extent may indicate at least one selected from the group consisting of whether the extent is referred to for reproduction of another extent, whether the extent is requisite for reproduction of another extent, and whether at least a portion of the extent is replaceable by another extent. The control unit 920 may record a copy of the meta box in the container file to prevent a situation where the entire content cannot be reproduced when the meta box is damaged.

When the control unit 920 determines a file name of the container file, the control unit 920 may use a file name indicating the characteristic information of the component files and/or the characteristic information of the extents. In detail, the file name of the container file may be determined to indicate a characteristic of a component file recorded in at least one of a plurality of sections forming the data box. This is to provide a size of a corresponding section or information on a characteristic of a component file or extent recorded in the corresponding section through the file name of the container file. A characteristic of a section used for the file name may be represented by combining a separate identifier and a size of the section or defined by the meaning according to an appearing order of the section having a certain size as an agreement between a content provider and a content reproducing apparatus.

For example, when the file name of the container file is i100_d20000.ndf, i100_d20000.ndf may indicate that a space for data having the random access characteristic is 100 bytes and a space for data having the disposable consumption characteristic is 2000 bytes from the beginning of the container file.

In another example, when the file name of the container file is 100_100.ndf, it may be defined in advance and used that 100 bytes from the beginning of the container file are a space for data having the random access characteristic and 100 bytes immediately before the end of the container file are also a space for data having the random access characteristic.

When it is determined according to the file name that information on a plurality of sections having a same characteristic exists, it may be set for a content reproducing apparatus to differently process each section having the same characteristic. For example, when system resources are assigned to the plurality of sections, a better resource may be assigned to an early appearing section, and a worse resource may be assigned to a later appearing section. In detail, when the file name of the container file is i100_i300.ndf, the content reproducing apparatus may load an initial section of 100 bytes to a random access memory (RAM) and record a next section of 300 bytes in a hard disc drive (HDD) or may not record the next section of 300 bytes to thereby differently process according to an appearing order of sections.

When characteristic information of sections is provided through the file name, compared with a method of reading data in a section for separate processing after reading a portion of the container file and determining the section for separate processing, a reproducing operation may be efficiently performed, and there is an improved effect showing a further sequential access flow.

Figure 10:
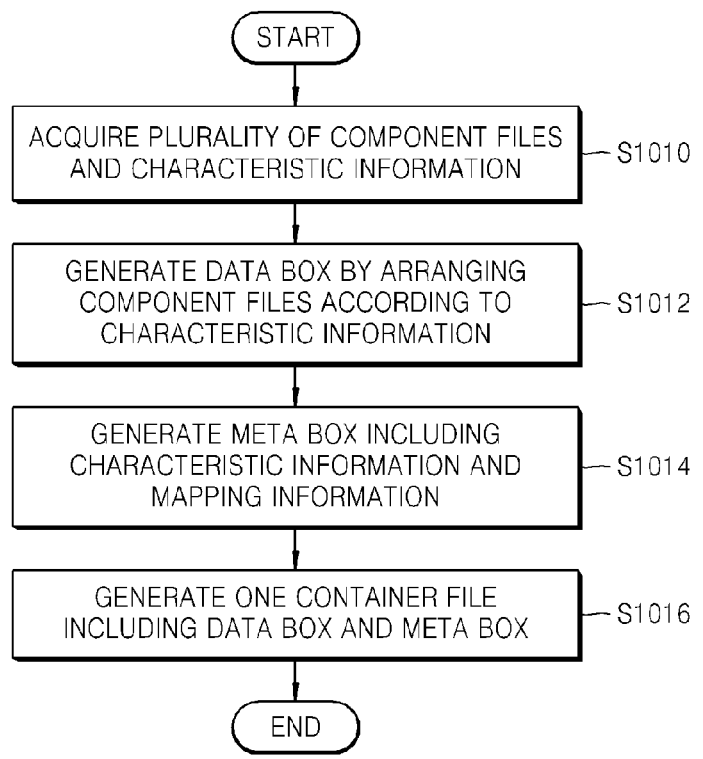
FIG. 10 is a flowchart illustrating a content providing method according to an embodiment of the present invention.

FIG. 10 is a flowchart illustrating a content providing method according to an embodiment of the present invention.

Referring to FIGS. 9 and 10, in operation S1010, a plurality of component files forming original content are acquired. The original content may be acquired from a medium of which a loading speed is slow, such as a Blue-ray disc. In addition, in operation S1010, characteristic information of the plurality of component files is acquired. The characteristic information may be determined by a producer of the original content and received through the user interface. In operation S1012, a data box in which the plurality of component files are arranged is generated according to the characteristic information. In operation S1014, a meta box including information on locations in the original content and in the data box with respect to the plurality of component files and the characteristic information is generated. The information on the locations in the original content and in the data box with respect to the plurality of component files is mapping information for mapping the locations in the original content with respect to the plurality of component files to the locations in the data box with respect to component files generated by reconfiguring the original content according to one or more embodiments of the present invention. In operation S1016, one container file is generated by recording the data box and the meta box in the one container file. The generated container file may be stored in the storage unit 930 of the content providing apparatus 930 or recorded in a separate recording medium (not shown) to be thereafter provided to a user.

Figure 11:
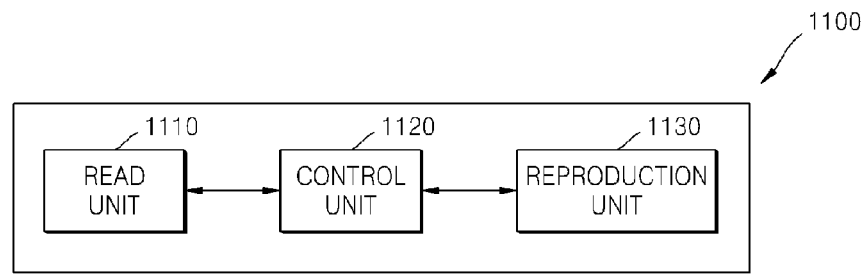
FIG. 11 is a block diagram of a content reproducing apparatus according to an embodiment of the present invention.

FIG. 11 is a block diagram of a content reproducing apparatus 1100 according to an embodiment of the present invention.

The content reproducing apparatus 1100 may include a read unit 1110, a control unit 1120, and a reproduction unit 1130. The read unit 1110 is to read a container file from a local storage unit (not shown) in the content reproducing apparatus 1100, a detachable information storage medium (not shown), or an external server (not shown) via a network. The container file is a file in which a data box in which a plurality of component files are recorded according to characteristic information of the plurality of component files and a meta box including information on locations in content and in the data box with respect to the plurality of component files and the characteristic information of the plurality of component files are recorded. When the container file is recorded on the information storage medium, the read unit 1110 may first read information included in the meta box from the information storage medium.

The control unit 1120 controls the read unit 1110 to read data recorded in the data box by referring to the information read from the meta box and controls the reproduction unit 1130 to reproduce the content by using the data read from the data box. The reproduction unit 1130 may include a decoder (not shown) for reproducing multimedia content.

The control unit 1120 may reduce an access time to a component file or extent to be randomly or frequently used by reading data corresponding to a component file or extent having characteristic information indicating a random access or a multiple-access from the information storage medium and loading the read data to another information storage medium of which a loading speed is faster than the information storage medium, thereby allowing efficient reproduction. Examples of an information storage medium of which a loading speed is relatively fast are a RAM, a flash memory, a solid state drive (SSD), a hard disc, an external storage device, an external server, and the like by are not limited thereto, and it would be obvious that another storage device may be used. Before accessing desired data in reproduction of the content, it is determined according to a characteristic described in the meta box whether the desired data corresponds to a component file or extent recorded in an information storage medium of which a loading speed is fast, and if the desired data is recorded in the information storage medium of which a loading speed is fast, the desired data is read from the information storage medium of which a loading speed is fast. In this case, the control unit 1120 may read a list of component files in the content and connect and manage logical addresses (e.g., paths in the content recorded on an optical disc) and physical addresses (e.g., locations of component files or extents in a container file recorded by reconfiguring the content, addresses in a RAM with respect to component files or extents loaded to the RAM, or the like).

The control unit 1120 may read in advance a certain portion of data corresponding to a component file or extent having the preloading characteristic and store the read portion in a memory of which a loading speed is fast. The control unit 1120 may map a path in the content with respect to each component file to an address in the data box by referring to information on a location in the content or in the data box with respect to each component file, which is recorded in the meta box.

The characteristic information may be defined for each of extents forming each component file, and in this case, the characteristic information may include information indicating a correlation characteristic between a plurality of extents. The control unit 1120 may control the reproduction unit 1130 to reproduce the plurality of extents by referring to the correlation characteristic between the plurality of extents. Information indicating a characteristic of an extent may indicate at least one selected from the group consisting of whether the extent is referred to when another extent is reproduced, whether the extent is requisite to reproduce another extent, and whether at least a portion of the extent is replaceable by another extent. The control unit 1120 may retry to read an extent that is referred to when another extent is reproduced or that is requisite to reproduce another extent or may receive the extent from an external device if the extent is not read from the information storage medium.

When an extent that is replaceable by another extent is not read from the information storage medium, the control unit 1120 may control the reproduction unit 1130 to reproduce a corresponding extent section by referring another extent instead of the extent.

Figure 12:
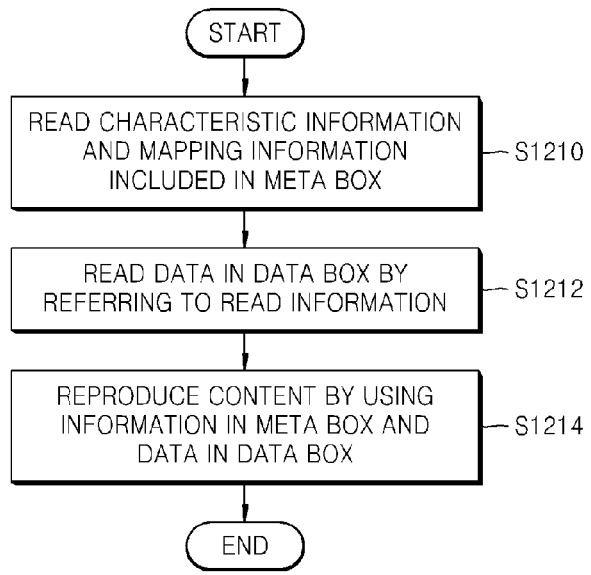
FIG. 12 is a flowchart illustrating a content reproducing method according to an embodiment of the present invention.

FIG. 12 is a flowchart illustrating a content reproducing method according to an embodiment of the present invention.

In operation S1210, characteristic information and mapping information are read from a meta box included in a container file. In operation S1212, data recorded in a data box of the container file is read by referring to the read information in the meta box. A time point a component file or extent is read or a loading location of the read component file or extent in a memory is determined according to the characteristic information, and which path a component file recorded in the data box has in original content may be determined by referring to the mapping information. In operation S1214, content is reproduced using the information in the meta box and the data read from the data box.

Figure 13:
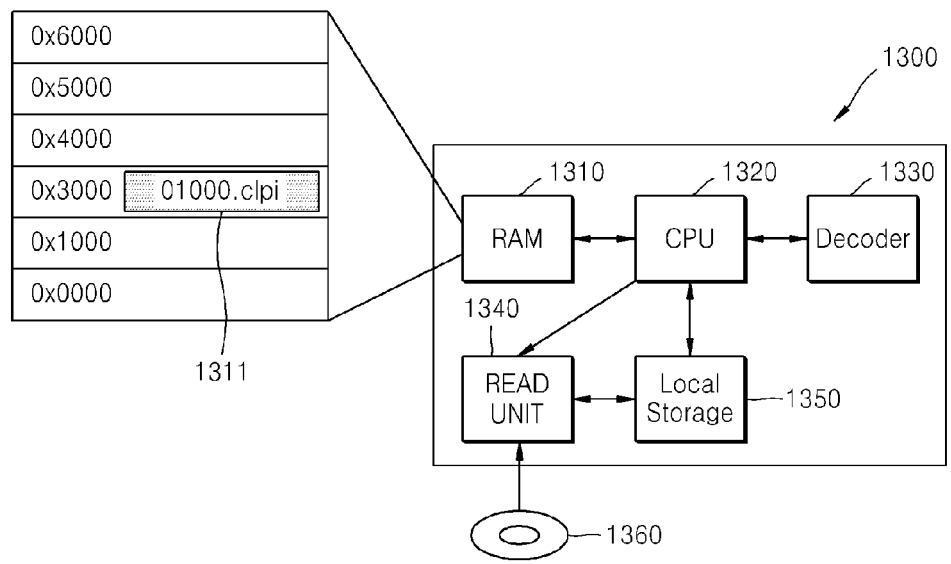
FIG. 13 illustrates a component file copied to a random access memory (RAM) of a content reproducing apparatus according to another embodiment of the present invention.

FIG. 13 illustrates a component file copied to a RAM 1310 of a content reproducing apparatus 1300 according to another embodiment of the present invention.

The content reproducing apparatus 1300 may include a central processing unit (CPU) 1320, a decoder 1330, a read unit 1340 for reading data from a disc 1360, a local storage 1350, and the RAM 1310 of which a loading speed is relatively fast. The CPU 1320 may reduce an access time in reproduction by copying the entire component file or partial extents forming a component file to the RAM 1310 according to characteristic information. Referring to FIG. 13, a component file 1311 named 01000.clpi is copied to an arbitrary address of the RAM 1310, and in this case, a physical location of 01000.clpi may be /dev/RAM/0x3000~0x4000. The content reproducing apparatus 1300 may determine a location from which desired data is read in reproduction by reading a list of component files in original content from a container file in the disc 1360 and connecting and managing logical addresses indicating locations in the original content and locations of extents of a component file in the disc 1360 of which a loading speed is slow or locations of extents of a component file in RAM 1310 of which a loading speed is fast.

Figure 14:
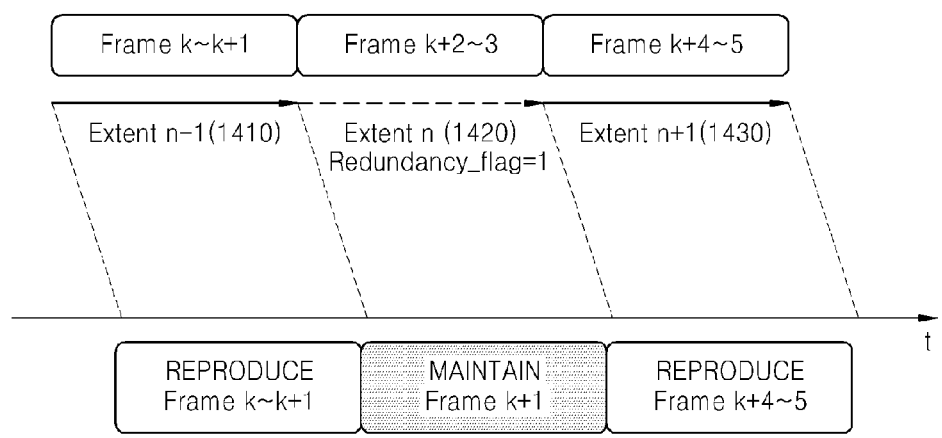
FIG. 14 illustrates a correlation between an extent and a reproducing time according to an embodiment of the present invention.

FIG. 14 illustrates a correlation between an extent and a reproducing time according to an embodiment of the present invention.

When content recorded in a container file delivered from a medium, a portion of which being hard to access due to an external cause, is reproduced, characteristic information assigned to component files in the content may be used as described below. If reading of a portion of an extent forming a component file fails in reproduction, a content reproducing apparatus may determine as described below according to a characteristic of the extent.

When a dependency characteristic of an extent is 1, this indicates that another extent referring to the extent exists, and thus, if the extent is lost or damaged, quality of a decoding result may be affected. When a necessity characteristic of an extent is 1, this indicates that another extent may not be reproduced without the extent. Thus, a content reproducing apparatus may try to read the extent again or may read the extent from an external source if reading of an extent of which a dependency or necessity characteristic is 1 fails. In this case, the content reproducing apparatus may determine the number of read retries or a request to an external source or not/a waiting time according to a magnitude of a value of dependency_counter.

When a redundancy characteristic of an extent is 1, it may be determined that a retry or a request to an external source is not necessary without the extent. If the extent is not read, a content reproducing apparatus may keep reproducing by reproducing a corresponding extent section using another extent or by skipping the extent and reproducing a next extent.

Referring to FIG. 14, even if reading of an extent 1420 of which a redundancy characteristic is 1 fails, a reproducing time of a previous extent 1410 and a subsequent extent 1403 based on the extent 1420 may match a total reproducing time of the three extents 1410, 1420, and 1430. This indicates that a reproducing time of the subsequent extent 1430 may be reproduced by being synchronized with an original reproducing time of content even when the extent 1402 is not read. For this synchronization reproduction, during a reproducing section of the extent 1420 which has not been read, a last frame k+1 of the previous extent 1410 may be maintained, or an intermediate image may be generated and used on the basis of an image of the frame k+1 and a first frame K+4 of the subsequent extent 1403.

Figures 15, 16:
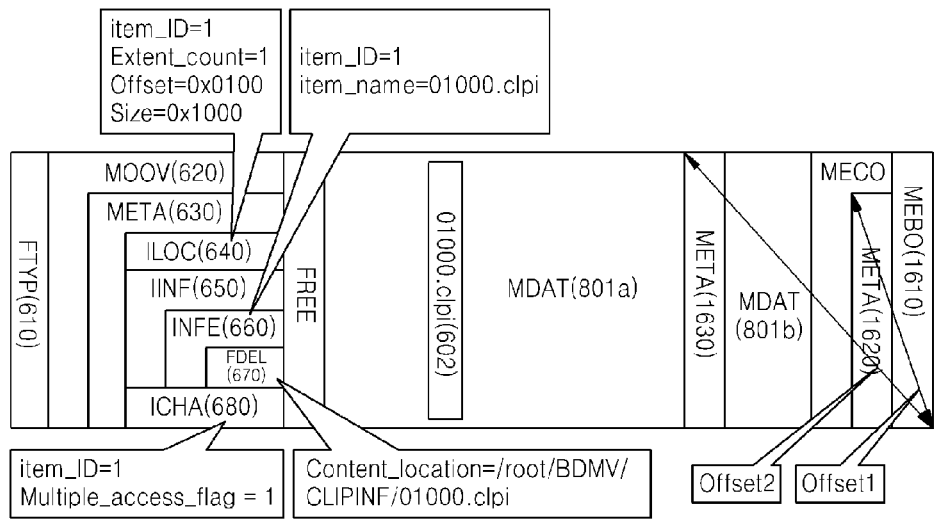
FIG. 15 illustrates backup information of a meta box according to an embodiment of the present invention.
FIG. 16 illustrates a container file including a MEBO box according to an embodiment of the present invention.

FIG. 15 illustrates backup information of a meta box according to an embodiment of the present invention.

Since a meta box in a container file includes not only basic information, such as a file name and a path of a component file, but also various kinds of characteristic information, if it is hard to access a corresponding portion of a recording medium on which the container file is recorded, the entire container file may not be used. To solve this problem, a copy of the meta box may be inserted into the container file.

FIG. 15 illustrates a meta data backup offset (MEBO) box that is backup information when a copy of a meta box in the ISOFF is added to a container file, wherein the MEBO box includes number_of metadata_backup 1510 indicating the number of copies and offset 1520 indicating a location of each copy. Since the meta box is located at a beginning part of the container file, the copy may be located at an end part of the container file, and the MEBO box notifying of a size of the meta box may also be located at the end part of the container file. This is because the possibility that both the original and the copy of the meta box are damaged is large when the original and the copy of the meta box are recorded at locations close to each other.

FIG. 16 illustrates a container file including a MEBO box 1610 according to an embodiment of the present invention, wherein the MEBO box 1610 includes information copies 1620 and 1630 of a meta box.

Referring to FIG. 16, two pieces of offset information Offset1 and Offset2 recorded in the MEBO box 1610 indicate how much byte offsets the copies 1620 and 1630 of the meta box have on the basis of the last byte of the container file. The MEBO box 1610 may be located at the end of the container file. A content reproducing apparatus may perceive where the copies 1620 and 1630 of the meta box exist in the container file by referring to information in the MEBO box 1610 when reading of the meta box 630 fails.

A method according to an embodiment of the present invention may be implemented in a form of program instructions executable by various computer means and recorded on a computer-readable medium. The computer-readable medium may include program instructions, data files, data structures, and the like, taken alone or in combination. The program instructions recorded on the computer-readable medium may be specially designed and configured for one or more embodiments of the present invention or may be usable by being known to those of ordinary skill in the art. Examples of the computer-readable medium are magnetic media, such as hard disks, floppy disks, and magnetic tapes, optical media, such as CD-ROM and DVD, magneto-optical media, such as floptical disks, and hardware devices, such as ROM, RAM, flash memory, and the like, specially configured to store and execute program instructions. Examples of the program instructions are machine language codes generated by a compiler and high-level language codes executable by a computer using an interpreter or the like.

In addition, other embodiments of the present invention can also be implemented through computer-readable code/instructions in/on a medium, e.g., a computer-readable medium, to control at least one processing element to implement any above described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An non-transitory information storage medium executed by a computer comprising:
   one container file, wherein the container file comprises:
   a data box in which a plurality of component files forming content are arranged; and
   a meta box including information on locations in the content and in the data box with respect to the plurality of component files and characteristic information on the plurality of component files, and
   the plurality of component files are arranged in the data box according to the characteristic information,
   wherein the characteristic information comprises information indicating an access pattern to the plurality of component files when reproducing the plurality of component files.

2. The non-transitory information storage medium of claim 1, wherein component files having same or similar characteristics are recorded on sequential locations in the data box according to the characteristic information.

3. The non-transitory information storage medium of claim 1, wherein the access pattern indicates at least one selected from the group consisting of a random access, a multiple-access, a disposable access, and a preload.

4. The non-transitory information storage medium of claim 1, wherein the characteristic information further comprises information indicating characteristics of a plurality of extents forming each of the plurality of component files.

5. The information storage medium of claim 4, wherein the information indicating the characteristics of the plurality of extents indicates a correlation between the plurality of extents.

6. The information storage medium of claim 4, wherein the information indicating the characteristic of an extent indicates at least one selected from the group consisting of whether the extent is referred to when another extent is reproduced, whether the extent is requisite to reproduce another extent, and whether at least a portion of the extent is replaceable by another extent.

7. The information storage medium of claim 1, wherein the container file further comprises a copy of the meta box.

8. The information storage medium of claim 1, wherein the container file has a file name indicating the characteristic information.

9. The information storage medium of claim 1, wherein the file name of the container file indicates a characteristic of a component file recorded on at least one of a plurality of sections forming the data box.

10. A content providing method executed by a computer comprising:
    acquiring a plurality of component files forming content;
    acquiring characteristic information of the plurality of component files;
    generating a data box in which the plurality of component files are arranged according to the characteristic information;
    generating a meta box including information on locations in the content and in the data box with respect to the plurality of component files and the characteristic information; and
    generating one container file including the data box and the meta box,
    wherein the characteristic information comprises information indicating an access pattern to the plurality of component files when reproducing the plurality of component files.

11. The content providing method of claim 10, wherein the generating of the data box comprises arranging component files having same or similar characteristics on sequential locations in the data box according to the characteristic information.

12. The content providing method of claim 10, wherein the access pattern indicates at least one selected from the group consisting of a random access, a multiple-access, a disposable access, and a preload.

13. The content providing method of claim 10, wherein the characteristic information further comprises information indicating characteristics of a plurality of extents forming each of the plurality of component files.

14. The content providing method of claim 13, wherein the information indicating the characteristics of the plurality of extents indicates a correlation between the plurality of extents.

15. The content providing method of claim 13, wherein the information indicating the characteristic of an extent indicates at least one selected from the group consisting of whether the extent is referred to when another extent is reproduced, whether the extent is requisite to reproduce another extent, and whether at least a portion of the extent is replaceable by another extent.

16. The content providing method of claim 10, further comprising recording a copy of the meta box in the container file.

17. The content providing method of claim 10, wherein the generating of the container file comprises assigning a file name indicating the characteristic information to the container file.

18. The content providing method of claim 10, wherein the file name of the container file indicates a characteristic of a component file recorded on at least one of a plurality of sections forming the data box.

19. A content reproducing method executed by a computer comprising:
reading information included in a meta box from one container file recorded on an information storage medium, the container file comprising a data box in which a plurality of component files forming content are arranged according to characteristic information of the plurality of component files and the meta box including information on locations in the content and in the data box with respect to the plurality of component files and the characteristic information of the plurality of component files;
reading data recorded in the data box by referring to the information included in the meta box; and
reproducing the content by using the information included in the meta box and the data read from the data box,
wherein the characteristic information comprises information indicating an access pattern to the plurality of component files when reproducing the plurality of component files.

20. The content reproducing method of claim 19, wherein the reading of the data comprises reading data corresponding to a component file having characteristic information indicating a random access or a multiple-access from the information storage medium and loading the read data on another information storage medium of which a loading speed is faster than the information storage medium.

21. The content reproducing method of claim 19, wherein the reading of the data comprises preloading a certain portion of data corresponding to a component file having characteristic information indicating a preload.

22. The content reproducing method of claim 19, wherein the reproducing of the content comprises mapping a path of each component file in the content to an address of each component file in the data box by referring to the information included in the meta box.

23. The content reproducing method of claim 19, wherein the characteristic information comprises information indicating a correlation characteristic between a plurality of extents forming each of the plurality of component files, and
the reproducing of the content comprises reproducing the plurality of extents by referring to the correlation characteristic between the plurality of extents.

24. The content reproducing method of claim 23, wherein the correlation characteristic between the plurality of extents indicates at least one selected from the group consisting of whether a corresponding extent is referred to when another extent is reproduced, whether the corresponding extent is requisite to reproduce another extent, and whether at least a portion of the corresponding extent is replaceable by another extent.

25. The content reproducing method of claim 24, further comprising retrying to read a corresponding extent or receiving the corresponding extent from an external device if the corresponding extent to be referred to or requisite for reproduction of another extent cannot be read from the information storage medium.

26. The content reproducing method of claim 24, further comprising reproducing a corresponding extent section by referring to another extent if an extent replaceable by another extent cannot be read from the information storage medium.

27. A content providing apparatus comprising:
a processor configured to implement upon execution:
an input unit for acquiring a plurality of component files forming content and characteristic information of the plurality of component files;
a control unit for generating a data box in which the plurality of component files are arranged according to the characteristic information, a meta box including information on locations in the content and in the data box with respect to the plurality of component files and the characteristic information, and one container file including the data box and the meta box; and
a storage unit for storing the generated container file,
wherein the characteristic information comprises information indicating an access pattern to the plurality of component files when reproducing the plurality of component files.

28. The content providing apparatus of claim 27, wherein the controller arranges component files having same or similar characteristics on sequential locations in the data box according to the characteristic information.

29. The content providing apparatus of claim 27, wherein the access pattern indicates at least one selected from the group consisting of a random access, a multiple-access, a disposable access, and a preload.

30. The content providing apparatus of claim 27, wherein the characteristic information further comprises information indicating a correlation characteristic between a plurality of extents forming each of the plurality of component files.

31. The content providing apparatus of claim 30, wherein the correlation characteristic between the plurality of extents indicates at least one selected from the group consisting of whether a corresponding extent is referred to when another extent is reproduced, whether the corresponding extent is requisite to reproduce another extent, and whether at least a portion of the corresponding extent is replaceable by another extent.

32. The content providing apparatus of claim 27, wherein the controller records a copy of the meta box in the container file.

33. The content providing apparatus of claim 27, wherein the controller assigns a file name indicating the characteristic information to the container file.

34. The content providing apparatus of claim 33, wherein the file name of the container file indicates a characteristic of a component file recorded on at least one of a plurality of sections forming the data box.

35. A content reproducing apparatus comprising:
a processor configured to implement upon execution:
a read unit for reading information included in a meta box from one container file recorded on an information storage medium, the container file comprising a data box in which a plurality of component files forming content are arranged according to characteristic information of the plurality of component files and the meta box including information on locations in the content and in the data box with respect to the plurality of component files and the characteristic information of the plurality of component files;

a reproduction unit for reproducing the content; and a control unit for controlling the read unit to read data recorded in the data box by referring to the information included in the meta box and controlling the reproduction unit to reproduce the content by using the information included in the meta box and the data read from the data box, wherein the characteristic information comprises information indicating an access pattern to the plurality of component files when reproducing the plurality of component files.

36. The content reproducing apparatus of claim 35, wherein the controller reads data corresponding to a component file having characteristic information indicating a random access or a multiple-access from the information storage medium and loads the read data on another information storage medium of which a loading speed is faster than the information storage medium.

37. The content reproducing apparatus of claim 35, wherein the controller preloads a certain portion of data corresponding to a component file having characteristic information indicating a preload.

38. The content reproducing apparatus of claim 35, wherein the controller maps a path of each component file in the content to an address of each component file in the data box by referring to the information included in the meta box.

39. The content reproducing apparatus of claim 35, wherein the characteristic information comprises information indicating a correlation characteristic between a plurality of extents forming each of the plurality of component files, and the controller controls the reproduction unit to reproduce the plurality of extents by referring to the correlation characteristic between the plurality of extents.

40. The content reproducing apparatus of claim 39, wherein the correlation characteristic between the plurality of extents indicates at least one selected from the group consisting of whether a corresponding extent is referred to when another extent is reproduced, whether the corresponding extent is requisite to reproduce another extent, and whether at least a portion of the corresponding extent is replaceable by another extent.

41. The content reproducing apparatus of claim 40, wherein the controller retries to read a corresponding extent or receives the corresponding extent from an external device if the corresponding extent to be referred to or requisite for reproduction of another extent cannot be read from the information storage medium.

42. The content reproducing apparatus of claim 40, wherein the controller controls the reproduction unit to reproduce a corresponding extent section by referring to another extent if an extent replaceable by another extent cannot be read from the information storage medium.

43. A non-transitory computer-readable storage medium having stored therein program instructions, which when executed by a computer, perform the content providing method comprising:

acquiring a plurality of component files forming content;

acquiring characteristic information of the plurality of component files;

generating a data box in which the plurality of component files are arranged according to the characteristic information;

generating a meta box including information on locations in the content and in the data box with respect to the plurality of component files and the characteristic information; and generating one container file including the data box and the meta box, wherein the characteristic information comprises information indicating an access pattern to the plurality of component files when reproducing the plurality of component files.

44. A non-transitory computer-readable storage medium having stored therein program instructions, which when executed by a computer, perform the content reproducing method comprising:

reading information included in a meta box from one container file recorded on an information storage medium, the container file comprising a data box in which a plurality of component files forming content are arranged according to characteristic information of the plurality of component files and the meta box including information on locations in the content and in the data box with respect to the plurality of component files and the characteristic information of the plurality of component files;

reading data recorded in the data box by referring to the information included in the meta box; and reproducing the content by using the information included in the meta box and the data read from the data box, wherein the characteristic information comprises information indicating an access pattern to the plurality of component files when reproducing the plurality of component files.

* * * * *